US005286507A

United States Patent [19]

Abler

[11] Patent Number: 5,286,507

[45] **Date of Patent: * Feb. 15, 1994**

[54] METHOD FOR TRANSFER OF FOOD MATERIAL SLICES

[75] Inventor: Norman C. Abler, Madison, Wis.

[73] Assignee: OScar Mayer Foods Corporation, Madison, Wis.

[ * ] Notice: The portion of the term of this patent subsequent to Dec. 29, 2009 has been disclaimed.

[21] Appl. No.: 973,436

[22] Filed: Dec. 17, 1992

Related U.S. Application Data

[63] Continuation of Ser. No. 860,842, Mar. 31, 1992, Pat. No. 5,174,431, which is a continuation-in-part of Ser. No. 690,481, Apr. 24, 1991, Pat. No. 5,149,554.

[51] Int. Cl.[5] .................... A23L 1/00; B65B 35/00

[52] U.S. Cl. .................... 426/420; 426/129; 426/414

[58] Field of Search .............. 426/420, 129, 130, 410, 426/414, 417; 53/244, 517; 198/428, 462; 271/196

[56] References Cited

U.S. PATENT DOCUMENTS

| | | | |
|---|---|---|---|
| 3,475,184 | 10/1969 | La Mers et al. | 426/420 |
| 3,481,746 | 12/1969 | La Mers et al. | 426/420 |
| 3,907,095 | 9/1975 | Russell et al. | 198/407 |
| 3,978,642 | 9/1976 | Smithers | 53/517 |
| 4,020,614 | 5/1977 | Smithers | 53/517 |
| 4,041,676 | 8/1977 | Smithers | 53/517 |
| 4,532,751 | 8/1985 | Mally et al. | 53/517 |
| 5,174,431 | 12/1992 | Abler | 426/420 |

*Primary Examiner*—George Yeung

*Attorney, Agent, or Firm*—Lockwood, Alex, FitzGibbon & Cummings

[57] ABSTRACT

An apparatus for transferring individual slices of food material from a food material supply source to a support member includes at least two rotating hollow drums disposed on and rotating around two associated stationary inner drums. The first rotating drum is disposed proximate to the food material supply, while the second rotating drum is disposed proximate to the support member and the first rotating drum. The stationary drums have hollow inner cores to which negative air pressure in the form of a vacuum is supplied which causes individual material slices to adhere to the outer shell of the first drum and transfer to the outer shell of the second drum.

30 Claims, 3 Drawing Sheets

METHOD FOR TRANSFER OF FOOD MATERIAL SLICES

RELATED APPLICATIONS

This application is a continuation application of my co-pending patent application Ser. No. 860,842, filed on Mar. 31, 1992 for "Rotary Apparatus for Transfer of Food Material Slices", now U.S. Pat. No. 5,174,431, which is a continuation-in-part of prior application Ser. No. 690,481 filed Apr. 24, 1991, now U.S. Pat. No. 5,149,554.

BACKGROUND AND SUMMARY OF THE PRESENT INVENTION

The present invention relates generally to an apparatus for accurately transferring slices of material in rapid succession between two locations, and, more particularly, to an apparatus for accurately and reliably transferring successive, individual food product slices of a food material from a first support member such as a conveyor to a second support member such as a backing board or conveyor without distorting the slice. The present invention finds particular suitability in the transfer of cooked food materials.

The movement or transfer of food product slices, such as bacon, has typically been an extremely labor-intensive operation. Because of the random shaping and sizing of the food product slices, the best mode in the past for transferring food product slices has been picking up the slices by hand from a conveyor and transferring the slices onto a second support surface, such as individual product trays or product support webs. The irregular shape and size of food product slices in general contributes to the problems associated with the transfer thereof. Additionally, because of their relative thinness, some food products, particularly bacon slices, have a flexible and delicate nature which renders any manual transfer process impractical.

Moreover, food product slices commonly have product liquids and/or oils associated with them which imparts an adhesive nature to the slices such that the slices tend to adhere to the first support member and attempts to remove the same from the support member result in distortion of the shape of the slice. Additionally, where the food material slices have been previously cooked immediately after exit from an oven, the slices still contain excess heat energy which must be dissapated before packing.

Because of the above, conventional mechanical means of picking up food product slices to transfer them, such as by scraping or combing are impractical. To avoid these problems, manual labor is used to pick up the food product slices from a conveyor and transfer them to another support web. Such manual transfer is costly and not as efficient as an automated system.

Quick transfer of food product slices and exact placement thereof on a support web without altering the shape of the slices is also desirable to allow the slicing and packaging components of the production line to operate at the most efficient speeds possible. Accurate registration of the individual material slices on the support member is also desirable to ensure that the support member is properly loaded. One way to effect such a desired transfer is to apply a normal force to the food product slices.

Some attempts at material slice transfer mechanisms have utilized rotating drums which draw a vacuum through air passages on the outer surface of the drums to retain food product material slices in place thereon during the transfer operation. Such mechanisms are described in U.S. Pat. No. 3,978,642, No. 4,020,614 and No. 4,041,676. Such a mechanism is also described in U.S. Pat. No. 5,051,268. All of these mechanisms utilize a vacuum to pick up the food product slice and transfer from one location to another location.

The present invention is therefore directed to a transfer apparatus which provides highly efficient and accurate registration of food product slices and, when incorporated into an overall slicing and packaging production line, it can facilitate high-speed transfer of food material slices between components, such as oven conveyors, and product support components, thereby enabling the production line to operate at higher speeds. The present invention sequentially captures individual product slices by applying a force substantially normal to the plane of the food product slice without disrupting the food product slice by either stretching or distorting the same. In doing so, the present invention reduces problems related to common production line variables, such as the product temperature, thickness and texture, including oil or grease characteristics, which can commonly affect the speed at which such slices are transferred. Additionally, when the present invention is used to transfer precooked food material slices, it exposes the precooked food product slices to high velocity air during transport and thus provides a means to dissipate heat therefrom. Further, the present invention provides a means to remove excess liquid grease and fat from the product during transfer of product.

In accordance with the present invention, food material slices which have been previously severed from a material supply and are transferred from a first conveyor such as an oven take-off conveyor to a product support member, such as a conveyor, a continuous support web, or an individual package support member by an arrangement of one or more rotating drums. The rotating drums are located near to the first conveyor so that an outer surface thereof is positioned close to a precooked slice. The slice, whether cooked or uncooked, is attracted toward the drum pneumatically, by way of a negative air pressure environment which is maintained within the interior of the drum. This negative air pressure causes the food product slice to adhere to the outer surface of the drum while the drum rotates between the slice pick-up location and the desired slice deposit locations.

When the drum reaches the deposit location, the negative air pressure holding the food product slice to the drum is released and the slice may either fall off of the drum by virtue of its own weight or it may be urged off of the drum by an urging means onto the deposit location. The rotation of the drum(s) may be advantageously synchronized with the conveyor bringing the slices to the drum to obtain a predetermined spacing between successive material slices. The negative air pressure which adheres individual slices to the rotating drum during the transfer process advantageously eliminates the need for any mechanical transfer member. Additionally, the rotating drum reduces the distance which the product slice must travel unrestrained to a minimum, thereby eliminating risk of distortion of the same.

Accordingly, it is a general object of the present invention to provide an improved apparatus for transferring material slices from one location to another location.

Another object of the present invention is to provide an improved rotating drum assembly for use in a transfer apparatus whereby individual, successive, precooked food material slices are transferred, without distortion, from a first support member onto a second support member.

Another object of the present invention is to provide an improved apparatus for transferring food material slices from a first support member, such as a conveyor to a second support member which may include a second conveyor or a plurality of discrete second support members such as product trays wherein the transfer apparatus includes a plurality of rotating drums, wherein each rotating drum attracts, sequentially, a single food product slice onto its outer surface by way of negative air pressure, the rotating drums being arranged in close proximity to each other such that transfer of food product slices is effected between adjoining drums.

It is yet a further object of the present invention to provide a transfer apparatus for precooked food product slices having two coaxially disposed cylindrical drum members, the first of which being a rotating drum and the second of which being a non-rotating drum, the first drum rotating coaxially around the second, non-rotating drum, the second, or inner, drum having an internal pneumatic chamber operatively associated therewith for conveying negative air pressure to the outer surface of the first rotating drum to adhere material slices thereon and a means for blocking the flow of negative air pressure to the first drum outer surface, whereby material slices fall off of the first drum, the second drum having a plurality of distinct passages which respectively communicate air pressure to the first drum outer surface, the apparatus thereby providing a means to cool the precooked product quickly prior to packaging of the product.

Yet a further object of the present invention is to provide a transfer apparatus having two coaxially aligned, operatively associated cylindrical members, the outer member being capable of rotational movement around the inner member, the outer member having at least one material slice receiving portion thereon which holds food material slices in place by negative air pressure, the negative air pressure providing a means to remove liquid fat, grease or the like from the food material slices before the packaging thereof, and the transfer apparatus further having means for maintaining the food slice grease in a liquid state for removal from the apparatus.

These and other features and objects of the present invention will become more apparent from a reading of the following detailed description.

BRIEF DESCRIPTION OF THE DRAWINGS

In the course of this description, reference will be made to the attached drawings, wherein.

DETAILED DESCRIPTION OF THE PREFERRED EMBODIMENTS

FIGS. 1-4 illustrate a material transfer mechanism 10 constructed in accordance with the principles of the present invention and suitable for use within an overall material transfer apparatus 100. Although the improved apparatus and methods which are described in the detailed description which follows will be particularly described in the context of the transfer of precooked bacon slices, it will be appreciated that the present invention will bring substantially equal advantages to the transfer of other food products which may have shapes different than those of bacon slices, but are similar to bacon slices in their thinness and frangibility.

Figure 3:
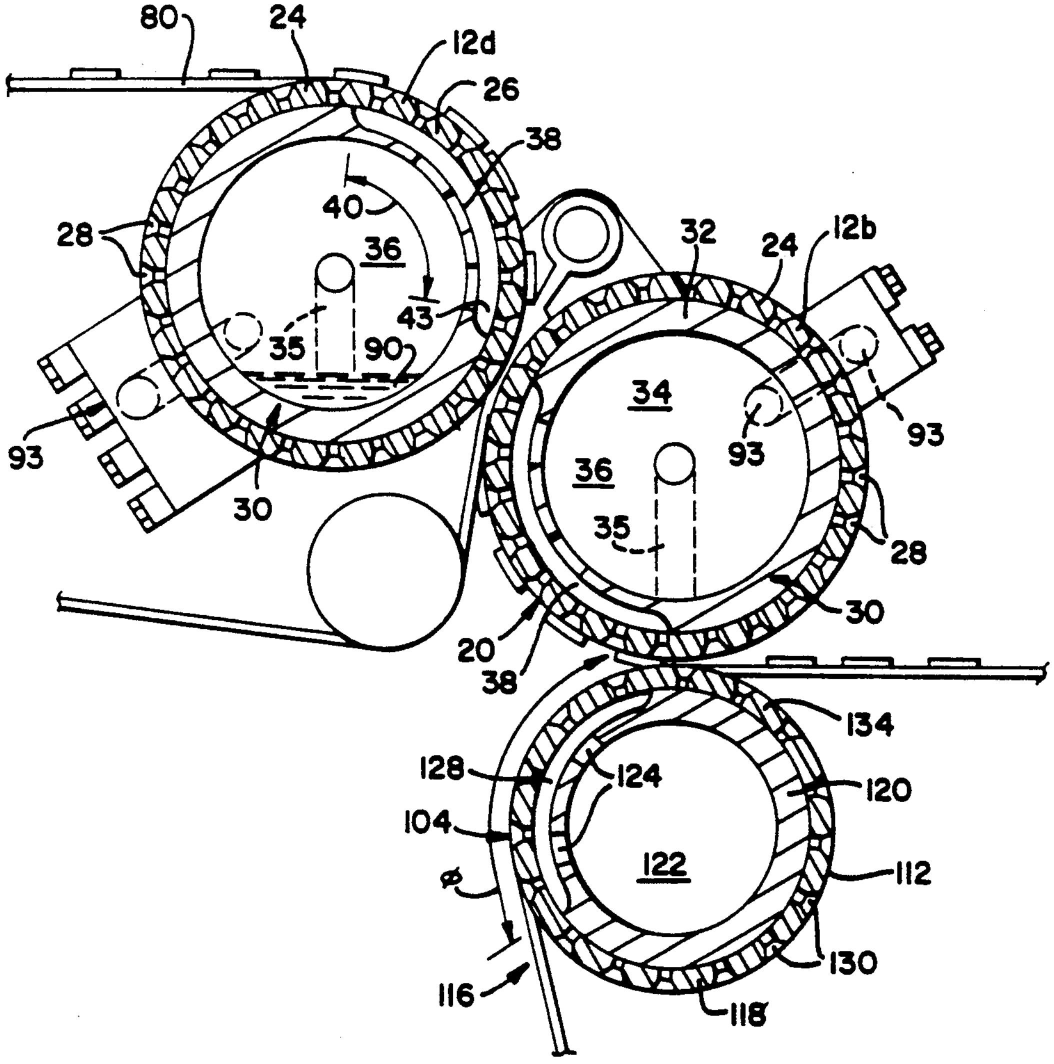
FIG. 3 is an enlarged sectional view of FIG. 1 showing the last two transfer rollers.
Figure 4:
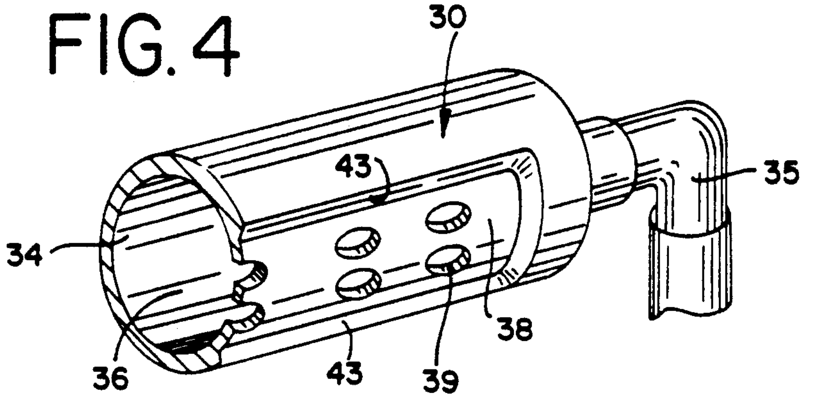
FIG. 4 is a detailed view of a portion of the surface of the inner cylinder of the material transfer apparatus of FIG. 1; and, FIG. 5 is a sectional view of an alternate embodiment of a material transfer apparatus using two transfer cylinders.

As best viewed in FIG. 3, the transfer apparatus 100 itself lends itself to particular utility when disposed adjacently between two support members, shown as a first takeoff conveyor 102 and a second take-off conveyor 104. The first take-off conveyor 102 may be one extending from the exit of the oven (not shown) where the food material slices are transferred after cooking, or it may be a conveyor located between any two components of the production line prior to cooking. In any event, the take-off conveyor 102 is conventional in the sense that it includes a generally flat conveyor surface 106 formed by a continuous fabric belt or a segmented metal or plastic belt 107 driven by drive rollers 108. The second take-off conveyor 104 is also conventional in that it may include a generally flat conveyor belt 110 driven by rollers 112. In the environment shown, the second take-off conveyor 104 is illustrated as carrying a paper substrate, or continuous web 114, onto which the food product slices, such as bacon slices 16 are deposited in a predetermined pattern wherein the spacing between adjacent bacon slices 16 may be preselected.

Figure 1:
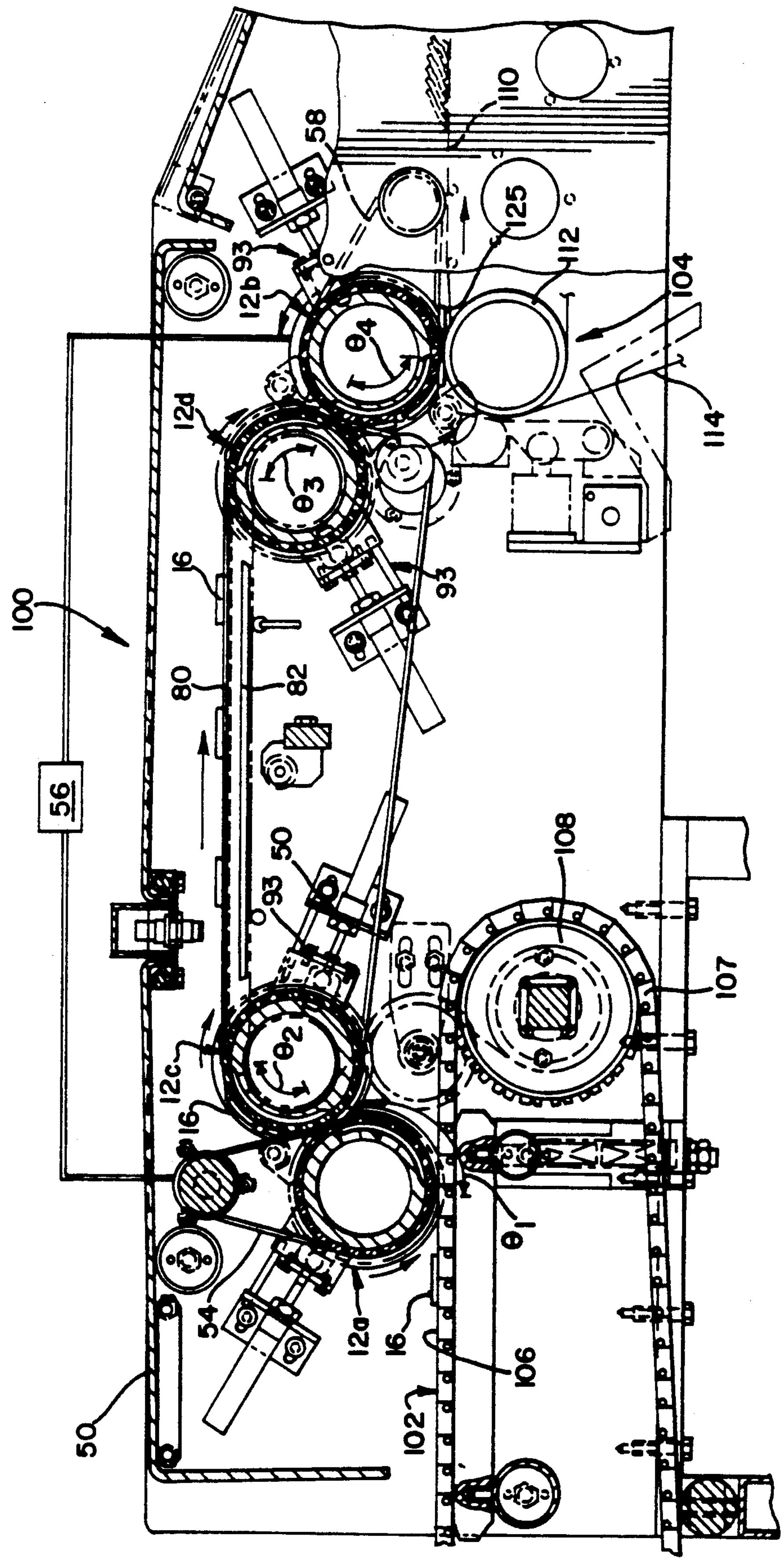
FIG. 1 is an elevational view, partially in section, of a material transfer apparatus constructed in accordance with the principles of the present invention.

In instances where the second take-off conveyor 104 carries a paper web 114, such as that illustrated in FIG. 3, the second conveyor 104 may utilize a rotating drum assembly 116 as a driving means having an outer rotatable drum 118 coaxially disposed over a stationary, inner drum 120. The inner drum 120 is hollow and the interior space-thereof serves as a pneumatic plenum 122 which is connected to a source of negative air pressure to cause a vacuum of a desired magnitude within the plenum 122. The inner drum 120 has one or more openings 124 in its sidewall 126 which pneumatically communicate with a recessed area 128 of the inner drum 120. This recessed area 128 extends for a preselected angular extent around the circumference of the inner drum 120. The outer rotatable drum 118 has a series of openings or apertures 130 disposed thereon which extend through its sidewall to provide a series of passages 132 which pneumatically communicate the vacuum of the inner drum plenum 122 with the exterior surface 134 of the outer drum 118 to thereby pneumatically adhere the support web 114 to the outer drum 118 for the angle 0. When the inner drum recessed area 128 ends, the negative air pressure supplied to the outer drum 118 is blocked and the support web 114 is conveyed off of the drum 118. Alternatively, instead of a continuous support web of paper, the second support member may include one or more discrete product backing members, such as product trays 125 as shown in FIG. 1.

Figure 2:
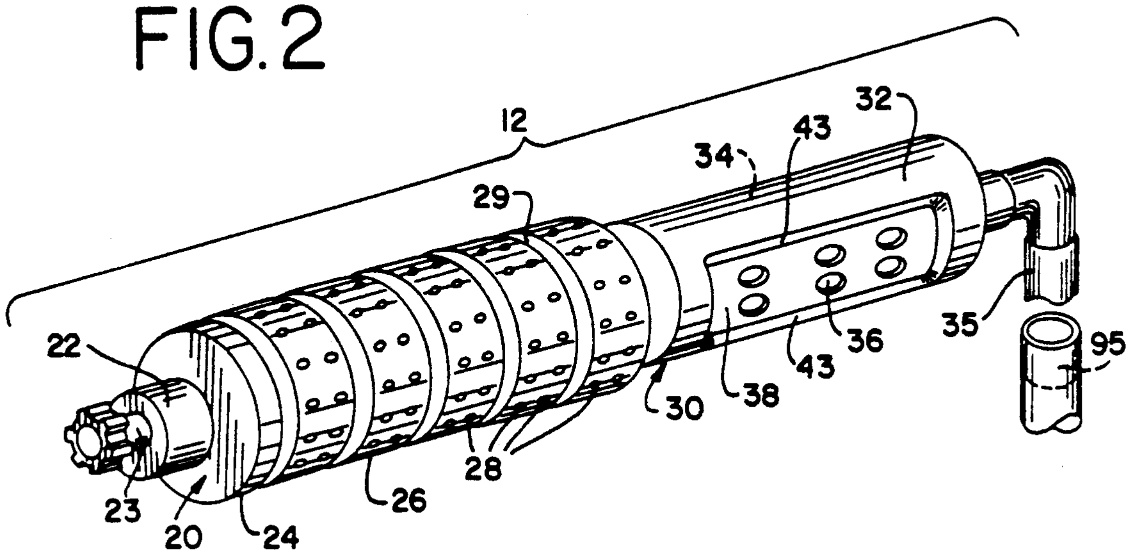
FIG. 2 is an exploded perspective view of one of the material transfer cylinders utilized in the material transfer apparatus of FIG. 1.

Returning now to FIG. I in which the general details of the transfer apparatus are shown and to FIG. 2 in which the details of an individual rotating member 12 used in the transfer apparatus 100 are best illustrated, it can be seen that the transfer apparatus 100 includes one or more rotating transfer means or members 12. Each of the rotating members 12 typically include a rotatable outer drum 20 and a stationary inner drum or core 30. Pairs of the rotating members 12 are mounted in tandem such that one such member 12*a* is proximate to the take-off conveyor 102 and extends generally horizontally over the same. Another such member 12*b* is mounted proximate to the second take-off conveyor 104 and also extends generally horizontally across the same. The remaining two, or secondary pair of rotating members 12*c* and 12*d* are mounted generally parallel to the first two rotating members 12*a*, 12*b* and slightly above the same.

The rotatable drum 20 is coaxially mounted in the inner stationary drum 30 and extends for substantially the entire length of the same. The outer drum 20 is capable of free rotation in either a clockwise or counterclockwise direction. In this regard, the inner stationary drum 30 is fixed to a frame assembly 50 and the outer drum 20 is rotatably mounted at an end thereof on a frame 50. For rotational purposes, the outer drum 20 may have an outwardly extending hub portion or spindle 22 which terminates at one end thereof in a shaft 23 which is further connected to a suitable drive means (not shown) utilizing either conventional drive belts or drive gears 21 mounted on the drum shaft 23.

The outer drum 20 includes a hollow, cylindrical shell member 24 having a substantially flat outer cylindrical surface 26. A plurality of apertures 28 are disposed in the outer drum outer surface 26 and extend completely therethrough. These apertures 28 permit the passage of negative air pressure from the inner drum pneumatic plenum 36 to the outer drum outer surface 26 to apply a vacuum force thereto to retain the bacon slices 16 in place upon the drum material transfer surface 26. Additionally, these apertures 28 permit the vacuum drawn within the drums 20 to draw ambient air therethrough which, as explained below, provide a cooling effect on the food material slices 16.

For use in the multiple drum application which is illustrated in FIGS. 1-3, some of the outer drums 20 may further include a plurality of circumferential grooves 29 which accommodate one or more flexible bands 80. The bands 80 reliably interconnect the two upper transfer drums 12*c* and 12*d* and span the distance between them, and also provide an effective transfer path for the food product slices 16 to follow. The bands 80 also serve to assist in the removal of any food material slices 16 from the outer surfaces of the drums 20 because of oil, grease or similar substances. A support plate 82 may be disposed beneath the bands 80 to catch any food slices which may fall off of the bands 80 during rotation and movement through the air between the two transfer drums. During the time food product slices traverse the distance between the pairs of rotating members 12*a*–12*d*, as well as during the time the food product slices 16 are captured by vacuum on the drum outer surfaces 26, the food products are exposed to a movement of air.

Where the transfer apparatus 100 is positioned to remove product exiting from an oven, the transfer apparatus serves to cool the recently cooked product by dissipating residual heat into the air during the transfer process. Additionally, ambient temperature air is drawn through the air apertures 28 in the outer drum 20, which air chills the drum 20 and in turn provides a relatively cool surface which the cooked product slices 16 contact to effectively chill them. Movement of the food product slices 16 through the air between the two drums 20 also causes a cooling effect thereon.

The air apertures 28 located in the first and second drum member outer surface may be arranged in either a preselected or random pattern. The preselected pattern may be chosen to accommodate certain variables such as the width of material to be sliced and any desired spacing between successive material slices. For example, where cooked bacon slices 16 are being transferred, the pattern of the air apertures 28 may include generally rectangular discrete patterns of apertures 28. However, any configuration will suffice provided that the length and width of each discrete pattern provides an area sufficiently large to adhere the food product slice 16 to the rotating drum outer surface 26.

The inner stationary core member, or drum 30 has a construction generally similar to the outer drum 20 in that it also includes a generally cylindrical hollow shell member 32. The outer diameter of the inner drum 30 closely matches the inner diameter of the outer drum 20 to provide an effective pneumatic seal between the two drums 20 and 30 for effective operation of the transfer apparatus as described below. The interior portion 34 of the inner drum 30 includes a pneumatic plenum 36 which extends for substantially the entire length thereof. This plenum 36 opens into and freely communicates with a vacuum pipe or conduit 35. This vacuum conduit 35 is connected to a source of negative air pressure and supplies a vacuum to the interior of the second drum 30 to provide a vacuum or suction force which holds sequentially sliced material, such as the bacon slices 16, onto the outer surface 26 of the outer drum 20. The inner drum 30 has a recessed area 38 disposed on its outer surface 34 which extends along the circumference of the drum 30 for a preselected angular length. This recess 38 defines a suction zone 40 on an arc length of the inner drum 30 wherein negative air pressure is applied to the outer drum 20. One or more openings 39 in the recessed area 38 extend completely through the inner drum shell member 32. These openings 39 provide a means to pneumatically communicate the vacuum drawn in the interior pneumatic plenum 36 through the inner drum 30 and outwardly to the outer drum material transfer surface 26.

Two edges 43 of the outer surface 34 of the stationary inner core 30 define the recess 38 thereon and its associated suction zone 40. The remaining portion of the inner drum 30 serves as a block to shield the arrays of apertures 28 of the outer drum 20 from the vacuum drawn in the inner drum plenum 36. The vacuum holding the material slices 16 to the outer drum transfer surface 26 is released when the air apertures 28 pass over the solid portion of the inner core 30.

As mentioned above, the inner drum pneumatic plenum 36 communicates with a significantly large extent of the outer drum 20 by way of the suction zone 40 and thereby defines a first material transfer operational arc length, $\theta_1$, of the transfer apparatus 10. The first arc length $\theta_1$ generally extends between the point of operative intersection, or tangency, between the first rotating means outer drum 20*a* and the first take-off conveyor 102 and the point of operative intersection or tangency between the first rotating member 12a and its adjacent rotating member 12c.

A second arc length $\theta_2$ is defined in the second rotating member 12c which generally begins (but slightly overlaps) at the end of the first arc length $\theta_1$ The second arc length $\theta_2$ ends at generally the uppermost portion of the second rotating member 12c. A third arc length $\theta_3$ is similarly defined on the transfer apparatus third rotating member 12d and begins at generally the uppermost portion thereof and extends to the point of operative intersection of the third and fourth rotating members 12d and 12b. A fourth arc length $\theta_4$ is similarly defined on the fourth and last rotating means 12d and ends at a point above the second take-off conveyor 104.

As previously mentioned, the drive means is operatively connected to the outer drum(s) 20 and may be further operatively connected to either of or both of the first and second take-off conveyors such that rotation of the outer drum(s) 20 may be synchronized therewith. In this regard, a suitable indexing means 56 may be provided to control the timing and velocity of the outer drums 20 so that the movement thereof corresponds to the timing and velocity of the conveyors 102 and 104.

Figure 5:
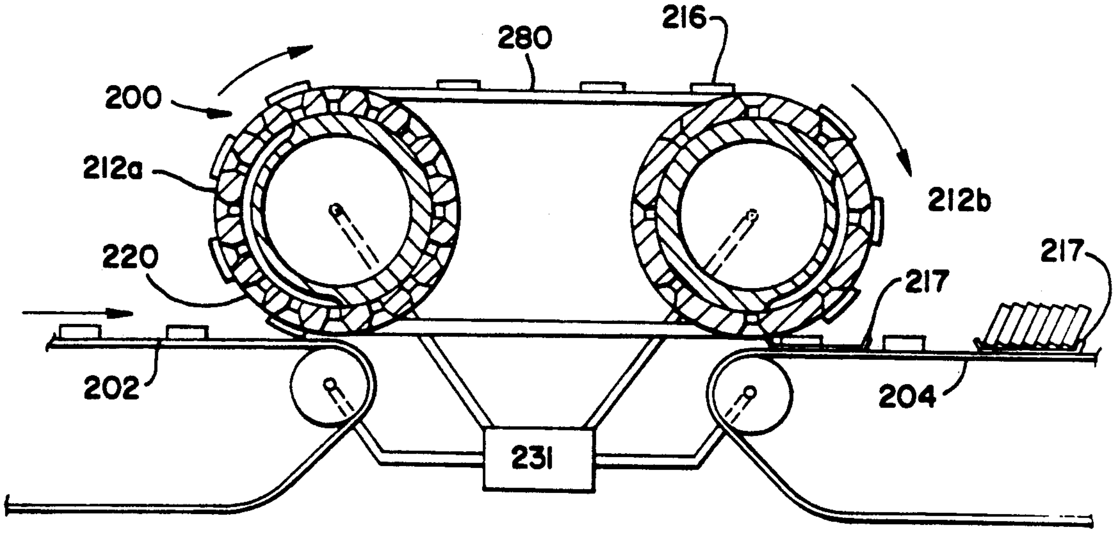

FIG. 5 shows an alternate embodiment of a transfer apparatus 200 constructed in accordance with the principles of the present invention which includes only a pair of rotating members 212a, 212b arranged in tandem and interconnected by flexible bands 280. In this embodiment, the rotating drums 220 are disposed proximate to and above the respective opposing take-off conveyors 202 and 204. Further in this embodiment, the second support member, take-off conveyor 204 has a series of spaced product trays 217 deposited thereon prior to it reaching its point of operative contact with the second rotating member 212b. The movement of the conveyor 204 may be controlled by a suitable indexing means 231 which indexes the movement of the second conveyor 204 with the movement(s) of the first conveyor 202 and the two transfer drums 220 such that a plurality of food material slices 216 are deposited in place in the product tray 217.

In operation of the present invention, a vacuum is drawn in the plenum 36 of the inner drum 30, causing air to be drawn through the outer drum air apertures 28 into the recess and the plenum 36. As the outer drum 20 passes over a food slice 16, the vacuum in the suction zone 40 thereof adheres the slice 16 to the outer surface 26 of the first drum 12a across the suction zone thereof, until it contacts the suction zone of the second, adjacent drum 12c. At that point, flexible bands 54, prevent any occasional adherent food material slice (the adherence being caused by surface fluids such as oil, grease, moisture or the like) from remaining on the first drum 12a instead of being transferred to the second drum 12c. The slice 16 leaves that suction zone and is gently urged off of the second drum 12c onto the bands 80 and traverses the space between the second and third drums, 12c and 12d. The slice 16 is adhered to the third drum suction zone until it contacts the suction zone of the fourth drum 12b. At this point, bands 80 also preclude any occasional adherent material slice from remaining on the third drum 12d. The stripper bands 58 on the fourth drum similarly preclude any occasional adherent slice from remaining on fourth drum 12b and assist the transfer drums in depositing the material slices onto the second support member 104 in their predetermined location.

The negative air pressure being drawn through the apertures 28 also serves to remove at least a portion of the surface fluids of the food material slice into the drums where they can be collected by a suitable collection mechanism. In-this regard, the apparatus may also preferably include a novel means for automatically cleaning the drum apertures 28, such as is shown at 60 in FIG. 1. The inner drum 30 collects grease from the load product slices 16 by way of the vacuum force applied to the slices 16 through the drum apertures 28. The vacuum draws the grease 90 off of the slices 16 into the inner drums 30. The grease 90 is subsequently removed therefrom by way of the vacuum piping 35. In order to keep the grease 90 in a form suitable for conveyance through the vacuum piping 35, a steam injection apparatus 93 may be provided on selected drums as shown in FIG. 1. This injection apparatus 93 injects a predetermined amount of steam into the interior of the inner drum 30 at predetermined or constant time intervals to maintain the temperature therein above the solidification temperature of the grease or fat. This maintains the grease 90 in a fluid state, so that it can be drawn through the vacuum piping 35 where it is collected in a suitable grease trap 95.

The outer drum 20 may be rotated at either substantially the same or at a different speed as the material slices 16 on the first conveyor 102. In either instance, the material slice receiving portion constituted by the air apertures 28 is always indexed above the material slice 16 to capture the material slice 16 onto the outer drum transfer surface 26. Because the material slice 16 is captured onto the material transfer surface 26 of the outer drum 20 by a vacuum force which is substantially normal to the plane of the material slice, no damage to the slice occurs, such as tearing or stretching. The vacuum generated in the plenum 36 holds the slice 16 in place on the transfer surface 16 of one drum until it reaches the end of the suction zone arc length, at which point it is either captured onto another transfer drum or falls off of the drum onto the second take-off conveyor 104. As previously mentioned, an indexing drive means may control the rotation of the outer drums 20 to produce continuous or intermittent rotation to effect placement of the material strips onto the second support member, whether it be a take-off conveyor 104 or a discrete product support tray 217. The indexing means may further include means to stop the rotation of the outer drum 20 when a material slice 16 falls off the transfer apparatus.

It will be seen that while certain embodiments of the present invention have been shown and described, it will be obvious to those skilled in the art that changes and modifications may be made therein without departing from the true spirit and scope of the inventions.

I claim:

1. A method of transferring strips of food material comprising the steps of:

providing at least two rotating members, each of the rotating members having a non-rotating inner member;

rotating one of the two rotating members so that an outer surface thereof engages an individual food material strip;

applying negative air pressure to a portion of the one rotating member outer surface to adhere the individual food material strip to a material strip receiving portion of said one rotating member;

rotating said one rotating member while said individual food material strip is adhered to said one rotating member material strip receiving portion;

urging said individual food material strip off of said one rotating member and onto a material strip receiving portion disposed on an outer surface of the other rotating member;

rotating the other rotating member so as to move the other rotating member material strip receiving portion proximate to a support surface, and urging said individual food material strip off of said other rotating member onto the support surface.

2. The method of claim 1, wherein said individual food material strip is a meat food product.

3. The method of claim 2, wherein said individual food material strip is a slice of bacon.

4. The method of claim 1, wherein said one rotating member has a plurality of air apertures disposed on said outer surface thereof and said negative air pressure is applied to said one rotating member outer surface material strip receiving portion by drawing a vacuum through a first plenum disposed in said non-rotating inner member.

5. The method of claim 4, wherein said second rotating member also has a plurality of air apertures disposed in the outer surface thereof.

6. The method of claim 2, wherein said food material strip is a precooked food material strip and wherein said negative air pressure contacts a portion of each of said at least two rotating members to thereby cool said material strip receiving portions associated therewith which in turn cools said individual food material strip when it contacts said material strip receiving portions.

7. The method of claim 2, wherein said at least two rotating members are driven in unison by a drive means.

8. The method of claim 7, further including a first support surface having a moving food material strip support surface disposed proximate to said one rotating member, and wherein said two rotating members are driven at a speed substantially equal to a speed at which said moving food material strip support surface is driven.

9. The method of claim 2, further including the step of at least partially removing from said individual food material strip fluids associated with said individual food material strip.

10. The method of claim 9, further including the step of collecting the individual food material strip fluids in a portion of one of said non-rotating inner members.

11. The method of claim 10, further including the step of maintaining said individual food material strip fluids in a liquid state.

12. The method of claim 11, further including means for injecting steam into said one non-rotating inner member food material strip fluids collecting portion to maintain said food material strip fluids in said liquid state.

13. The method of claim 2, further including the step of blocking said negative air pressure from contacting said one rotating member outer surface.

14. A method for transferring food slices from a first support member to a second support member, comprising the steps of:

supplying a succession of food slices by way of the first support member to a food slice pickup location;

providing a first roller adjacent the food slice pickup location;

providing a second roller a preselected distance away from said first roller;

engaging an individual food slice in said first roller by drawing a vacuum at one area of said first roller to adhere an individual food slice from said first support member onto a food slice engaging portion of an outer surface of said first roller;

rotating said first roller to transfer said individual food slice on said first roller food slice engaging portion from said food slice pickup location to a food slice transfer location;

urging said individual food slice off of said first roller outer surface and onto a food slice engaging portion of an outer surface of said second roller;

drawing a vacuum at one area of said second roller to adhere said individual food slice onto a food slice engaging portion of an outer surface of said second roller;

rotating said second roller until said individual food slice is adjacent a food slice deposit location on said second support member, and depositing said individual food slice onto said second support member.

15. The method of claim 14, wherein said individual food slice is urged off of said first roller by at least one flexible band encircling said first roller in a circumferential groove.

16. The method of claim 14, wherein each of said first and second rollers include at least one circumferential groove disposed in the respective outer surfaces thereof and at least one flexible band disposed in said first and second roller circumferential grooves interconnecting said first and second rollers, said at least one flexible band urging said individual food slices off of said first roller outer surface food slice engaging portion.

17. The method of claim 14, wherein said succession of individual food slices are precooked food material slices.

18. The method of claim 17, wherein said precooked food material slices are meat food product slices.

19. The method of claim 14, wherein said succession of individual food slices are bacon slices.

20. The method of claim 14, further including the step of removing at least some fluids associated with said individual food slice and collecting the food slice fluids in a stationary member disposed within at least one of said two rollers.

21. The method of claim 20, further including the step of maintaining said stationary member at a temperature at which said food slice fluids are in a liquid state.

22. The method of claim 21, further including the step of periodically injecting steam into said stationary member.

23. The method of claim 14, further including the steps of:

releasing said vacuum drawn at said first roller food slice engaging portion when said individual food slice is urged off of said first roller; and releasing said vacuum drawn at said second roller food slice engaging portion to deposit said individual food slice onto said second support member.

24. The method of claim 14, further including the step of rotating said first and second roller in unison by drive control means.

25. The method of claim 24, further including the step of stopping rotation of said first and second rollers when said first support surface no longer has any food slices thereon.

26. The method of claim 14, wherein said vacuum drawn on said first and second rollers exerts negative air pressure on each of said first and second roller outer surfaces and exerts a cooling effect on said individual food slices contacting said first and second roller outer surfaces.

27. The method of claim 14, wherein said first support member is a oven take-off band.

28. The method of claim 23, wherein said first and second rollers include a plurality of apertures disposed in said outer surfaces thereof, and wherein said vacuum drawn in at least one of said first and second rollers is released by blocking said apertures.

29. The method of claim 14, wherein said individual food slice is deposited onto said second support member by releasing said vacuum drawn on said second roller.

30. A method for transferring food material slices from one slice support member to a second slice support member comprising the steps of:

providing first and second food slice contact members, each of the food slice contact members having an interior plenum through which a vacuum can be drawn;

drawing a vacuum through the first food slice contact member interior plenum and engaging a food slice on a predesignated slice engagement area of said first food slice contact member;

urging the food slice off of said first food slice contact member slice engagement area;

drawing a vacuum through said second food slice contact member interior plenum and engaging said food slice on a predesignated slice engagement area of said second food slice contact member; and removing said food slice from said second food slice contact member and depositing said food slice on the second slice support member.

* * * * *